(12) United States Patent
Simpson et al.

(10) Patent No.: US 6,265,055 B1
(45) Date of Patent: Jul. 24, 2001

(54) MULTILAYER STRETCH CLING FILM

(76) Inventors: David Simpson, 1719 Joben Dr.; Terry Jones, 439 Royal Glen Blvd., both of Murfreesboro, TN (US) 37128

(*) Notice: Subject to any disclaimer, the term of this patent is extended or adjusted under 35 U.S.C. 154(b) by 0 days.

(21) Appl. No.: 09/419,009

(22) Filed: Oct. 13, 1999

(51) Int. Cl.$^7$ ................................................ B32B 27/32
(52) U.S. Cl. ........................ 428/213; 428/354; 428/516; 428/215
(58) Field of Search .................. 428/516, 354, 428/213, 215

(56) References Cited

U.S. PATENT DOCUMENTS

| | | | |
|---|---|---|---|
| 4,996,094 | 2/1991 | Dutt | 428/212 |
| 5,334,428 | 8/1994 | Dobreski et al. | 428/34.9 |
| 5,399,426 | 3/1995 | Koch et al. | 428/335 |
| 5,595,705 | * 1/1997 | Walton et al. | 264/456 |
| 5,752,362 | 5/1998 | Eichbauer | 53/399 |
| 5,756,219 | * 5/1998 | Miro et al. | 428/516 |
| 5,814,399 | * 9/1998 | Eichbauer | 428/220 |
| 5,998,017 | 12/1999 | Eichbauer | 428/343 |

OTHER PUBLICATIONS

Research Disclosure "37632" Advantages of Metallocene Ethylene Polymer Resins in Blown and Cast Stretch Films, (1995).*
Research Disclosure "37644" Advantages of Metallocene Ethylene Polymer Resin Blends in Cast Films, (1995).*
Research Disclosure "37652" Advantages of Metallocene Ethylene Polymer Resin Blends in Blown and Cast Films (1995).*
Esposito, "Quintec Looking to Fill Stretch Film Niche", Plastic News, May, 1998.
Smith, "Quintec Films, Huntsman Resolve Lawsuit", Plastic News, Oct. 1998.
Shut, "Extrusion Close–Up–7 Layers Stretch Film Properties", Plastics Technology, Feb., 1999.
Smith, "Armin Stretch Film Plans A–OK", Plastic News, Jul., 1998.
Grace, "Thai Film Maker Plunges into Metallocenes", Plastic News, Feb., 1997.

* cited by examiner

Primary Examiner—Paul Thibodeau
Assistant Examiner—D. Lawrence Tarazano
(74) Attorney, Agent, or Firm—Waddey & Patterson; Richard S. Myers, Jr.

(57) ABSTRACT

A novel multi-layer stretch film comprising at least 7 layers and having excellent mechanical properties and stretch film performance, comprising two outer, or skin layers that have moderate to high controlled cling and low blocking characteristics, and at least five internal layers to assist in producing mechanical strength and stretchability. The resins used in the film composition include polypropylene (PP), ethylene propylene copolymers, low density polyethylene (LDPE), linear low density polyethylene (LLDPE), medium density polyethylene (MDPE), high density polyethylene (HDPE), metallocene-catalyzed polyethylene (mPE), very low density polyethylene (VLDPE), and/or ultralow density polyethylene (ULDPE). The resins also may be blended to achieve a desired range of physical or mechanical properties of the final film product.

28 Claims, 1 Drawing Sheet

MULTILAYER STRETCH CLING FILM

FIELD OF THE INVENTION

The present invention relates to multi-layer stretch cling films having at least seven individual layers in the film composition offering acceptable cling performance, good balance of strength and good elongation properties.

BACKGROUND OF THE INVENTION

In commercial packaging art, individual articles as well as bundles of articles, including bundles of articles on pallets, are frequently packaged using so called stretch cling film in a stretch wrapping technique. In the stretch wrapping technique, a thin web of film is stretched and applied under tension around the articles to be wrapped or bundled pater wrapping is complete, the film attempts to relax and thus applies a compressive force on the bundled articles prohibiting movement. It is desired that the stretch film have some inherent cling such that it will adhere to itself, and prevent relaxation back to its unstretched state so that the film will not unwrap and cause slippage of the stretched overlaid film layers.

As stated above, stretch wrap films are typically used in wrapping palleted loads of boxes, as well as individual boxes or articles such as furniture and the like. The stretch wrap films of the present invention may be applied various techniques such as by hand or may be applied using a mechanical apparatus specially designed to wrap pallets, for example. In one procedure for using stretch wrap films of the present invention, the load to be wrapped is to be placed upon a platform, or turntable, which is made to rotate and in so doing, to take up stretch wrap film supplied from a continuous roll. Rotational speeds are typically 5 to 50 revolutions per minute. Regardless of the specific wrapping procedure used, at the completion of the wrapping, the stretch wrap film is cut and attached to the underlying layer by cling, tack sealing, adhesive tape, spray adhesives, and the like. When the stretch film of the present invention is applied by hand, the operator typically holds an applicator or wrapping tool that holds the stretch wrap film roll. After the operator completes wrapping, the stretch wrap film is cut.

Mechanical properties that are important in stretch films include, for example, how far the film can be stretched (i.e., stretchability), the film's resistance to stretching, film tensile strength, film puncture resistance, film tear resistance and cling force.

SUMMARY OF THE INVENTION

The present invention is a novel multi-layer stretch film comprising at least 7 layers and having excellent mechanical properties and stretch film performance when compared to stretch films made using fewer than seven layers.

The film comprises two outer, or skin layers that have moderate to high controlled cling and low blocking characteristics, at least five internal layers to assist in producing mechanical strength and stretchability. The resins used in the film composition include polypropylene (PP), ethylene propylene copolymers, low density polyethylene (LDPE), linear low density polyethylene (LLDPE), medium density polyethylene (MDPE), high density polyethylene (HDPE), metallocene-catalyzed polyethylene (mPE), very low density polyethylene (VLDPE), and/or ultralow density polyethylene (ULDPE). Also, at least two of the resins may be blended to achieve a desired range of physical or mechanical properties of the final film product. The blend ratios may range from 99:1 to 1:99. More preferably, the blend ratios range from 95:5 to 5:95. Even more preferably, the blend ratios range from 90:10 to 10:90.

In one embodiment of the invention, the multi-layer, thermoplastic stretch wrap film of the present invention comprises two outer layers, at least one of which having a cling performance of at least 100 grams/inch. The at least one outer layer is selected from the group consisting of linear low density polyethylene, very low density polyethylene, and ultra low density polyethylene resins, with the resins being homopolymers, copolymers, or terpolymers, of ethylene and alpha-olefins. Each of five inner layers are selected from the group consisting of linear low density polyethylene, very low density polyethylene, ultra low density polyethylene, and metallocene-catalyzed linear low density polyethylene resins, said resins being homopolymers, copolymers, or terpolymers, of ethylene and alpha-olefins.

DETAILED DESCRIPTION OF THE INVENTION

Figure 1:
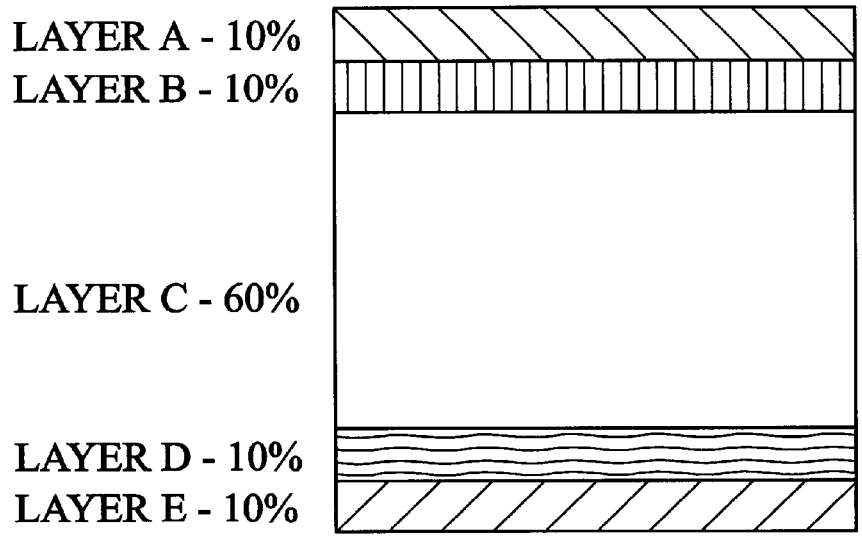
FIG. 1: A five-layer film representative of the prior art. Each layer is designated with A, B, C, D, or E, with the respective percentages of weight and/or thickness of the layer with respect to the total weight and/or thickness indicated.
Figure 2:
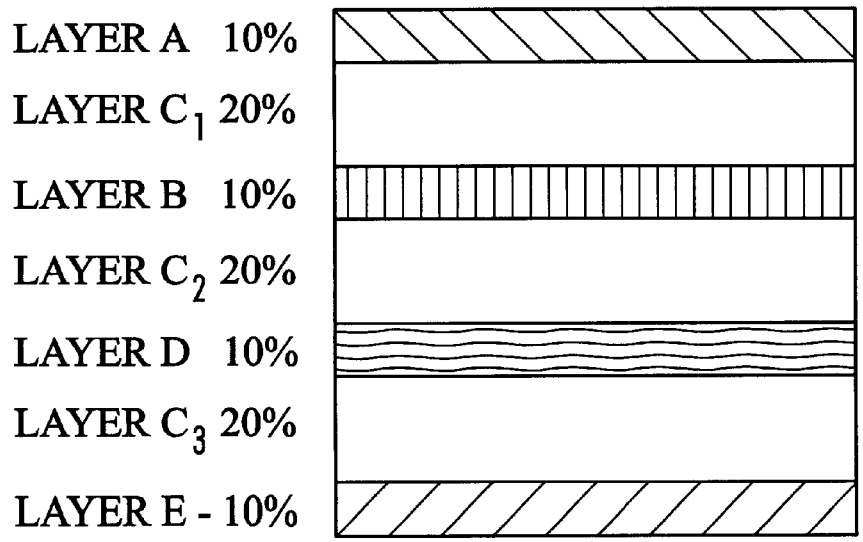
FIG. 2: A seven-layer film constructed in accordance with the present invention. Each layer is designated with A, $C_1$, B, $C_2$, D, or $C_3$, with the respective percentages of weight and/or thickness of the layer with respect to the total weight and/or thickness indicated.

The present invention relates to a stretch film comprising seven layers. The stretch films of the present invention are typically produced by the blown film or the cast film process. Films of the present invention include film constructions represented by, for example, of A/B/C/D/E/F/G where the A and G layers may be the same or different polymer resins, at least one of which is used for cling performance and the A, B, C, D, E, F and G layers or any combinations of said layers may be the same or different polymer resins selected for specific film end-use properties; A/C/B/C/D/C/E where A and E layers may be the same or different polymer resins, at least one of which is used for cling performance and A, B, C, D, and E layers and any combinations of said layers may be the same or different polymer resins for specific film end-use properties; A/B/C/D/E/B/F where A and F layers may be the same or different polymer resins, at least one of which is used for cling performance and A, B, C, D, E, and F layers or any combinations of said layers may be the same or different polymer resins selected for specific film end-use properties. Additionally, the films may be represented as A/B/C/D/C/B/A, or the like, wherein the same letter represents a layer of the same composition.

Outer Layers

The stretch wrap film of the present invention comprises two outer layers.

For acceptable stretch film performance, it is expected that at least one outer layer has a cling characteristic allowing it to adhere to an adjacent wrapping of film when applied to a unitized load. The use of polyethylene containing high hexane extractables (i.e., about >3.5% by weight, for example) in the outermost layers for cling is disclosed in, for example, U.S. Pat. Nos. 5,617,707; 5,516,475; 5,273,809; and 5,273,809; all of which are incorporated herein by reference. Concerns for having high hexane extractables containing polymers in the outermost layers exist because the high hexane extractables are believed to contribute to the problem of die lip build-up during extrusion and a build-up of low molecular weight olefinic material on fabrication equipment. Die lip build-up is typically degraded low molecular weight polyethylene and is undesirable because build up on the die lip can cause die lines that are inherent weak spots in film. Die lip build-up can also be pulled from the die as the film is extruded, resulting in black or brown spots in the film that can cause premature failure in film performance and are aesthetically unpleasing. A build-up of low molecular weight olefinic material is undesirable because the film surface may be negatively affected as the film is pulled through the fabrication equipment and may result in inconsistent cling performance.

Another concern with higher levels of hexane extractables is the contribution they make to film blocking on the roll. Films that contain resins with high levels of hexane extractables in the outermost layers can block while on the roll making the film difficult to remove resulting in holes and tears in the film prior to application. Therefore, in preferred embodiments of the present invention, the stretch wrap films have a hexane extractable level of less than about 3.5% by weight.

Using a tackifying or cling agent such as polybutene, polyisobutylene, and the like are also known in the art as disclosed in U.S. Pat. Nos. 5,569,693; 5,212,001; 5,175,049; 5,173,343; 5,154,981; 5,147,709; 5,141,809; 5,114,763; and 5,112,674; all of which are incorporated herein by reference. Using a cling agent adds to the cost of the final product, requires either preblending or alterations to production equipment to incorporate, and requires aging to bloom to the surface, all of which are negative aspects of its use.

It has also been disclosed that copolymers of ethylene and functional copolymers such as acrylates and vinyl acetate may be used as cling agents. For example, see U.S. Pat. Nos. 5,212,001; 5,173,343; 5,154,981; 5,141,809; 5,112,674; and 5,049,423; all of which are incorporated herein by reference. The copolymers of mention tend to be more expensive than conventional low density polyethylenes (LDPE) and linear low density polyethylenes (LLDPE) commonly used in stretch cling film formulations and tend to have lower ultimate enlongations than LLDPE resins, all of which are negative aspects for their use. Thus, in a preferred embodiment of the present invention, no cling additives are used in the films of the present invention.

When only one layer is used for cling performance, the stretch film of the present invention may be used as a differential cling film.

Suitable polyethylene resins for cling use are conventional linear low density polyethylene (LLDPE), very low density polyethylene (VLDPE), and ultralow density polyethylene (ULDPE) resins which are homopolymers, copolymers, or terpolymers, of ethylene and alpha-olefins. In copolymers, the weight percentages of the alpha-olefin is about 4 to 15% by weight, preferably from 6 to 12% by weight and more preferably from 6 to 10% by weight. Applicable apha-olefin comonomers include propylene, 1-butene, 1-pentene, 1-hexene, 4-methyl-1-pentene, 1-octene, and 1-octene. The alpha-olefins range from about $C_3$ to $C_{20}$, preferably $C_3$ to $C_{10}$, more preferably from $C_3$ to $C_8$. The resin melt index will typically be between 0.2 and 10 dg/min, preferably between 1 and 5 dg/min, and more preferably between 2 and 4 dg/min. Resin density will be between 0.860 and 0.940 g/cc density, preferably between 0.875 and 0.925 g/cc, and more preferably between 0.890 and 0.920 g/cc. If the LLDPE resins contain hexane extractables, it is desired that the hexane extractables levels be below approximately 3.5 weight percent to minimize potential for film blocking, high unwind noise, roll telescoping, roll softness and die lip build-up. Roll telescoping occurs when the outer layers of the roll film sag due to high lubricity of the hexane extractables resulting in a roll that is not as uniform. The outer layers used for cling performance will each be approximately 1 to 20 weight percent of the total film weight, preferably 2 to 15 weight percent of the total film weight, and more preferably 5 to 7 weight percent of the total film weight.

The resins that can be used in the outer layers may optionally contain known and conventional cling additives to supplement the inherent cling characteristics of at least one of the outer layers. Typical cling additives are discussed in U.S. Pat. No. 5,922,441, incorporated herein by reference. However, in a preferred embodiment of the invention, cling additives are not used. At least one of the two outer layers used for cling performance has an inherent cling performance without additives of at least 100 g/inch.

Inner Layers

The inner five layers are used for mechanical strength and stretchability. It is preferred that the inner five layers are different one to the other in that at least two different polymer resins are used in any combination to make up the five layers.

Suitable polyethylene resins used for strength are conventional linear low density polyethylene (LLDPE), very low density polyethylene (VLDPE), ultralow density polyethylene (ULDPE) resins, and metallocene catalyzed linear low density polyethylene (mLLDPE) which are homopolymers, terpolymers, or copolymers of ethylene and alpha-olefins. In copolymers, the weight percentage of the alpha-olefins resins is about 4 to 15% by weight, preferably from 6 to 12% by weight and more preferably from 6 to 10% by weight. Applicable alpha-olefin comonomers include propylene, 1-butene, 1-pentene, 1-hexene, 4-methyl-1-pentene, and 1-octene. The alpha-olefins range from about $C_3$ to $C_{20}$, preferably $C_3$ to $C_{10}$, more preferably from $C_3$ to $C_8$.

The resin melt index is between about 0.5 and about 10 dg/min, preferably between 1 and 5 dg/min, and more preferably between 1 and 3 dg/min. Resin density will be between 0.860 and 0.940 g/cc density, preferably between 0.875 and 0.925 g/cc, and more preferably between 0.890 and 0.920 g/cc.

Also suitable for use in the inner five layers for obtaining strength properties is low density polyethylene homopolymers (LDPE). For the low density polyethylene homopolymers, the resin melt index is between about 0.2 and about 10 dg/min, preferably between 0.2 and 5 dg/min, and more preferably between 0.2 and 3 dg/min. The resin density is between about 0.860 and about 0.940 g/cc density, preferably between 0.880 and 0.930 g/cc, and more preferably between 0.900 and 0.925 g/cc.

Additionally, at least one of the five inner layers comprise metallocene catalyzed polyethylene with a melt index of 0.5 to 5 dg/min, preferably 0.5 to 3 dg/min and a melt flow ratio of 16 to 80, preferably 16 to 50, wherein said at least one of said five inner layers comprise 5 to 80 weight percent of the total film composition.

As stated above, the multi-layer stretch films of the present invention are typically produced by the blown film or cast film process. The blown or cast film is formed by extrusion. The extruder is a conventional one using a die, which will provide the desired gauge. Some useful extruders are described in U.S. Pat. Nos. 4,814,135; 4,857,600; 5,076,988; 5,153,382; each of which are incorporated herein by reference. The gauge of the films of interest here can be in the range of about 0.3 to about 10 mils, preferably from about 0.5 to about 10 mils, and more preferably in the range of about 0.7 to about 2 mils. Examples of various extruders, which can be used in producing the film of the present invention, are the single screw type modified with a blown film die and air ring and continuous take off equipment. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided into three sections: the feed section, the compression section, and the meeting section. Multiple heating zones are present from the rear heating zone to the front heating zone, the multiple sections and zones running from upstream to downstream. If it has more than one barrel, the barrels are preferably connected in series. The length to diameter ratio of each barrel is in the range of about 16:1 to about 30:1. The extrusion can take place at temperatures in the range of about 160 to about 270 degrees Celsius, and is preferably carried out at temperatures in the range of about 180 to about 240 degreed Celsius.

Conventional blown and cast film processes are described in *Fundamentals of Polymer Processing*, Stanley Middleman, McGraw Hill, 1977; *Polymer Extrusion*, Chris Rauwendall, Hanser Publishers, 1986; and The *Encyclopedia of Chemical Technology*, Kirk-Othmer, John-Wiley and Sons, 1981; each of which are incorporated herein by reference.

When being applied to an article or pallet, the stretch wrap film of the present invention typically will be stretched to at least 150 to 350% of its original length, with the most common range being 200–250%.

The melt index of the layers of the films of the present invention is determined under ASTM D-1238, Condition E. It is measured at 190 degrees Celsius and 2.16 kilograms and reported as grams per 10 minutes. Flow index is determined under ASTM D-1238, Condition F. It is measured at 190 degrees Celsius and 10 times the weight used in determining the melt index, and reported as grams per 10 minutes. Melt flow ratio (MFR) is the ratio of flow index to melt index. It is understood by those skilled in the art that the lower the melt index or flow index, the higher the molecular weight. In the films of the present invention, the melt flow index range is typically from 0.2 to 10, preferably from 0.2 to 5, and more preferably from 0.2 to 3.

In another embodiment of the present invention, the stretch wrap film of the present invention may be used as a differential cling stretch wrap film. That is, the stretch wrap films of the present invention may comprise films whereby one outer layer has superior cling characteristics when applied in its stretched state and the other outer layer does not have superior cling characteristics. These types of films are commonly referred to as differential cling stretch wrap films or cling/slip films. Such a film may be advantageous when several pallets or articles wrapped with stretch film are loaded beside other wrapped articles. The outer layer of the film wrapping a stored or loaded pallet or article (sometimes called the "slip" layer) does not have superior cling characteristics, and therefore does not cling to an adjacent pallet or article. Therefore, chances of tearing of the stretch wrap film are reduced.

An example of an outer "slip" or differential cling layer is the outer slip layer of U.S. Pat. No. 5,922,441 incorporated herein by reference. That is, the outer slip layer may be constructed of various resin materials suitable for such purposes. Examples of such resins include polyolefin resins and copolymers of polyolefins such as polyethylene, polypropylene, and combinations thereof. Suitable polymer resins additionally include copolymers of polyethylene with minor amounts of other $C_{4-10}$ olefins, particularly $C_{6-8}$ polyolefins. Preferred polyethylenes include HPLDPE resins having a density of from about 0.92 to about 0.94 g/cm$^3$, and a melt index ($I_2$) of from about 1.0 to about 4.0 g/10 min., and LLDPE resins having a density of from about 0.925 to about 0.945 g/cm$^3$, and a melt index of from about 2.0 to about 5.0 g/10 min. Preferred polymers include polypropylenes, preferably isotactic, having a density of from about 0.89 to about 0.91 g/cm$^3$, and a melt index ($I_2$) of from about 5 to about 25 g/10 min. as determined by ASTM D1238.

The outer slip layer may include any of several anti-cling, slip or anti-block additives to improve the slip characteristics of the layer. Such additives include silicas, talcs, diatomaceous earth, silicates, lubricants, etc. These additives are generally blended with the resin material in an amount of from about 100 to about 20,000 ppm. When an outer slip layer is present in the stretch wrap film, an outer high cling layer as described above will be located as an opposing layer.

The overall properties of the stretch wrap film of the present invention are such that they have a cling force at 0% elongation of about 100 grams to about 300 grams as measured according to ASTM D5458.

Additionally, they have a relatively high puncture resistance as measured by the F-50 dart drop test procedure (ASTM D1709). It is the experience of those skilled in the art that the F-50 dart drop test is well correlated to the end use puncture resistance of stretch wrap films. The F-50 dart drop of a stretch wrap film is at least 75 to 200 g/mil.

The stretch wrap films of the present invention preferably have a overall transverse direction tear resistance (TD tear), as determined by ASTM D 1922 of at least about 400 to about 700 g/mil and MD Elmendorf tear of at least about 50 g/mil to about 350 g/mil.

In other embodiments of the present invention, the multi-layer, thermoplastic stretch wrap film of the present invention has a MD tensile elongation (%) of 400 to 700, a TD tensile elongation (%) of 600 to 900, a MD Elmendorf tear (g/mil) of 200 to 400, a TD Elmendorf tear (g/mil) of 450 to 700, and a dart impact (g) of from 100 to 300.

The stretch wrap films of the present invention are capable of being stretched from at least about 100% to about 400% of their original lengths, preferably about 150% to about 300%.

The overall thickness of the stretch wrap film of the present invention can vary widely depending upon the particular end use as determined by one of ordinary skill in the art, but the thickness is generally in the range of the typical thickness for stretch wrap films. Thus, the thickness is not known to be critical and can be easily adjusted by one of ordinary skill in the art to fit the appropriate end use. Conventional for such films is a thickness of from about 0.4 to about 3 mils, and the application is specific.

The individual layers, described as percentages by weight independent of thickness, vary from about 1% to about 30% of the total thickness of the film. The two outer layers are typically from 1 to 20% each, preferably from 2 to 10% each, more preferably from 5 to 7% each, regardless of the presence of a differential cling layer. The thickness the inner layers is typically from about 5 to 28%.

For example, the seven polymeric layers may be represented by the formula A/C/B/C/D/C/E, wherein the relative composition of the layers is 10/20/10/20/10/20/10 in % thickness and/or parts by weight. Also, the seven polymeric layers may be represented by the formula A/C/B/C/D/C/E, wherein the relative composition of the layers is 7/24/7/24/7/24/7 in % thickness and/or parts by weight.

In one embodiment of the present invention, the multi-layer, thermoplastic stretch wrap film of comprises seven polymeric layers are represented by the following formula: A/C/B/C/D/C/E, wherein A Represents:
  a $C_2/C_4/C_6$ very low density polyethylene terpolymer with a melt index of 2.5 dg/min and a resin density of 0.910 g/cc, with a thickness of 2% of the total thickness of said stretch wrap film, or
  a $C_2/C_6$ linear low density polyethylene copolymer blended with a $C_2/C_3$ copolymer to form a polymer with a melt index of 2.5 dg/min and a resin density of 0.915, with a thickness of 5% of the total thickness of the stretch wrap film;

B and D Represent:
  a $C_2/C_6$ metallocene catalyzed copolymer resin with a melt index of 1 or 2.5 dg/mm and a resin density of 0.910 g/cc and a melt flow ratio of 16–20 g/10 min; wherein D and D have a thickness of 7 to 10% of the total thickness of the stretch wrap film;

C Represents:
  a $C_2/C_6$ linear low density polyethylene copolymer with a melt index of 2 dg/mm and a resin density of 0.917 g/cc, or
  a $C_2/C_6$ linear low density polyethylene copolymer with a melt index of 2 dg/mm and a resin density of 0.917 g/cc blended with a low density polyethylene homopolymer with a melt index of 0.2 to 2 dg/mm at a ratio of 95:5 to 75:25; wherein C has a thickness of 60 to 81% of the total thickness of the stretch wrap film; and E Represents:
  a $C_2/C_4$ linear low density polyethylene copolymer with a melt index of 2 dg/mm, or
  a $C_2/C_6$ linear low density polyethylene copolymer with a melt index of 3 dg/mm and a resin density of 0.917 g/cc, wherein E has a thickness of 5 to 10% of the thickness of the stretch wrap film.

In another embodiment of the present invention, the seven polymeric layers are represented by the following formula: A/C/B/C/D/C/E, wherein A Represents:
  a $C_2/C_4/C_6$ very low density polyethylene terpolymer with a melt index of 2.5 dg/min and a resin density of 0.910 g/cc, with a thickness of 2% of the total thickness of said stretch wrap film, or
  a $C_2/C_6$ linear low density polyethylene copolymer blended with a $C_2/C_3$ copolymer to form a polymer with a melt index of 2.5 dg/min and a resin density of 0.915, with a thickness of 5% of the total thickness of the stretch wrap film;

B and D Represent:
  a $C_2/C_6$ metallocene catalyzed resin copolymer with a melt index of 1 dg/mm and a resin density of 0917 g/cc and a melt flow ratio of 16–20 g/10 min; wherein B and D have a thickness of 7 to 10% of the total thickness of the stretch wrap film;

C Represents:
  a blend of a $C_2/C_6$ linear low density polyethylene copolymer with a melt index of 1 dg/ mm and a low density polyethylene with a melt index of 2 dg/ mm in a ratio of 95:5 to 75:25; wherein C has a thickness of 60 to 81% of the total thickness of the stretch wrap film; and E Represents:
  a $C_2/C_4$ linear low density polyethylene copolymer with a melt index of 2 dg/mm, or
  a $C_2/C_6$ linear low density polyethylene copolymer with a melt index of 3 dg/mm and a resin density of 0.917 g/cc, wherein E has a thickness of 5 to 10% of the thickness of the stretch wrap film.

In yet another embodiment of the present invention, the seven polymeric layers are represented by the following formula: A/C/B/C/D/C/E, wherein A and E Represent:
  a $C_2/C_4$ linear low density polyethylene copolymer with a melt index of 2 dg/min and a resin density of 0.910 g/cc, with a thickness of 5 to 10% each of the total thickness of said stretch wrap film, B and D Represent:
  a $C_2/C_6$ linear low density polyethylene copolymer resin with a melt index of 2 dg/mm and a resin density of 0.910 g/cc, with a thickness of 7 to 10% of the total thickness of the stretch wrap film; and C Represents:
  a blend of a $C_2/C_4$ linear low density polyethylene copolymer with a melt index of 2 dg/mm and a density of 0.910 g/cc, with a thickness of 60 to 81% each of the total thickness.

The following example is given for illustration of the invention and is not intended to be limiting thereof.

EXAMPLE

This example demonstrates the advantage of films of the present invention that contain seven layers over films containing five layers.

A five layer film with a layer configuration of A/B/C/B/A with relative compositions of these layers being 10/10/60/10/10 parts by weigh are prepared on a cast film line with layer A and layer B extruders having barrel diameters of 1.5 inches with L/D 30:1 and layer C extruder having a barrel diameter of 3 inched and L/D of 30:1. Extrusion melt temperatures are between 500 and 575° F. with output rates set to give film production line speeds of approximately 1000 feet/min. Resins used to produce a five-layer film sample are as follows: A is a nominal 3.2 dg/min melt index, 0.917 g/cc density gas-phase produced hexene copolymer LLDPE; B is a nominal 2.5 dg/min melt index, 0.917 g/cc density gas-phase produced hexene copolymer metallocene catalyzed LLDPE; and C is a nominal 2.0 dg/min melt index, 0.917 g/cc density gas-phase produced hexene-copolymer LLDPE.

The inventive example is a seven-layer film with a layer configuration of A/C/B/C/D/C/E, with relative compositions of these layers of 10/20/10/20/10/20/10 parts by weight. The inventive example is prepared on a cast film line with A, B, D, and E extruders having barrel diameters of 2.5 inches and L/D of 30:1; and C extruder having a barrel diameter of 6 inches with L/D of 30:1. Extrusion melt temperatures are between 500 and 575° F. with output rates set to give film production line speeds of approximately 1000 feet/min. A and E are a nominal 3.2 dg/min melt index, 0.917 g/cc density gas-phase produced hexene-copolymer LLDPE, B and D are a nominal 2.5 dg/min melt index, 0.917 g/cc density gas-phase produced hexene copolymer metallocene catalyzed LLDPE; and C is a nominal 2.0 dg/min melt index, 0.917 g/cc density gas-phase produced hexene-copolymer LLDPE.

Film properties are tested according to ASTM procedures. Table 1 indicates the mechanical properties advantages found using seven film layers compared to five layer films.

| Property | ASTM Method | 5-layer Film | 7-layer Film |
| --- | --- | --- | --- |
| Film Thickness (mil) |  | 0.8 | 0.8 |
| MD Tensile Elongation (%) | D882 | 470 | 650 |
| TD Tensile Elongation (%) | D882 | 670 | 770 |
| MD Elmendorf Tear (g/mil) | D1922 | 230 | 320 |
| TD Elmendorf Tear (g/mil) | D1922 | 560 | 580 |
| Dart Impact (g) | D1709 | 140 | 160 |

As is demonstrated by the above table, film made according to the invention has higher elongation and better toughness than a film made with a similar polymer resin having less than seven layers.

The invention thus being described, it will be obvious that the same may be varied in many ways. Such variations are not regarded as a departure from the spirit and scope of the present invention, and all such modifications as would be obvious to one of ordinary skill in the art are intended to be included within the scope of the following claims.

We claim:

1. A multi-layer, thermoplastic stretch wrap film containing seven polymeric layers, comprising:
   (a) two outer layers, at least one of which having a cling performance of at least 100 grams/inch, said outer layer being selected from the group consisting of linear low density polyethylene, very low density polyethylene, and ultra low density polyethylene resins, said resins being homopolymers, copolymers, or terpolymers, of ethylene and alpha-olefins; and
   (b) five inner layers, with each layer being selected from the group consisting of linear low density polyethylene, very low density polyethylene, ultra low density polyethylene, and metallocene-catalyzed linear low density polyethylene resins; said resins are homopolymers, copolymers, or terpolymers, of ethylene and $C_3$ to $C_{20}$ alpha-olefins.

2. The multi-layer, thermoplastic stretch wrap film of claim 1, wherein said alpha-olefins are propylene, 1-butene, 1-pentene, 1-hexene, 4-methyl-1-pentene, or 1-octene.

3. The multi-layer, thermoplastic stretch wrap film of claim 1, wherein no cling additives are present in said stretch wrap film.

4. The multi-layer, thermoplastic stretch wrap film of claim 1, wherein said alpha-olefins range from $C_3$ to $C_8$.

5. The multi-layer, thermoplastic stretch wrap film of claim 1, wherein the said alpha-olefin content of said copolymers is 4 to 15% by weight.

6. The multi-layer, thermoplastic stretch wrap film of claim 1, wherein the resin melt index for each outer layer is 0.2 to 10 dg/min.

7. The multi-layer, thermoplastic stretch wrap film of claim 1, wherein the resin melt index for each inner layer is 0.5 to 10 dg/min.

8. The multi-layer, thermoplastic stretch wrap film of claim 1, wherein the resin density for each layer is about 0.860 to 0.940 g/cc.

9. The multi-layer, thermoplastic stretch wrap film of claim 1, wherein each of the outer layers are 2 to 15 weight percent of the total film weight.

10. The multi-layer, thermoplastic stretch wrap film of claim 1, wherein at least one said inner layer comprises low density polyethylene homopolymers, wherein said low density polyethylene homopolymers have a melt index of between about 0.2 to 10 dg/min; and a resin density of between about 0.86 to 0.94 g/cc.

11. The multi-layer, thermoplastic stretch wrap film of claim 1, wherein the second outer layer is a slip layer.

12. The multi-layer, thermoplastic stretch wrap film of claim 1, wherein the cling force at 0% elongation is about 100 grams to 300 grams as measured according to ASTM D5458.

13. The multi-layer, thermoplastic stretch wrap film of claim 1, wherein the transverse directional tear resistance is at least about 400 to 700 g/mil as determined by ASTM D1922 and a MD Elmendorf tear resistance of at least about 50 g/mil to 350 g/mil.

14. The multi-layer, thermoplastic stretch wrap film of claim 1, wherein each of said outer layers have a thickness of 5 to 7% each of the total thickness of the film, and
   each of said five inner layers have a thickness of 5 to 28% each of the total thickness of the film.

15. The multi-layer, thermoplastic stretch wrap film of claim 1, wherein said seven polymeric layers are represented by the following formula: A/C/B/C/D/C/E, wherein the relative thickness of the layers is 10/20/10/20/10/20/10, % thickness, respectively,
   wherein layers A and E each comprise a linear low density polyethylene hexene-copolymer, layers B and D each comprising a metallocene catalyzed linear low density polyethylene copolymer, and each layer C comprises a linear low density polyethylene hexene-copolymer.

16. The multi-layer, thermoplastic stretch wrap film of claim 15 wherein layers A and E have a melt index of 3.2 dg/min and a density of 0.917 g/cc; layers B and D have a melt index of 2.5 dg/min and a density of 0.917 g/cc; and each layer C has a melt index of 2.0 dg/min and a density of 0.917 g/cc.

17. The multi-layer, thermoplastic stretch wrap film of claim 1, wherein said stretch wrap film has a MD tensile elongation of 400 to 700%, a TD tensile elongation of 600 to 900%, a MD Elmendorf tear of 200 to 400 g/mil, a TD Elmendorf tear of 450 to 700 g/mil, and a F-50 dart impact of from 100 to 300 g.

18. The multi-layer, thermoplastic stretch wrap film of claim 1, wherein said seven polymeric layers are represented by the following formula: A/C/B/C/D/C/E, wherein
   layer A comprises:
      a $C_2/C_4/C_6$ very low density polyethylene terpolymer with a melt index of 2.5 dg/min and a resin density of 0.910 g/cc, and layer A is 2% of the total thickness of said stretch wrap film, or
      a $C_2/C_6$ linear low density polyethylene copolymer blended with a $C_2/C_3$ copolymer to form a polymer with a melt index of 2.5 dg/min and a resin density of 0.915, and layer A is 5% of the total thickness of the stretch wrap film;

layer B and D each comprise:
a $C_2/C_6$ metallocene catalyzed copolymer resin with a melt index of 1 or 2.5 dg/mm and a resin density of 0.910 g/cc and a melt flow ratio of 16–20 g/10 min; wherein B and D each have a thickness of 7 to 10% of the total thickness of the stretch wrap film;

layers C comprise:
a $C_2/C_6$ linear low density polyethylene copolymer with a melt index of 2 dg/mm and a resin density of 0.917 g/cc, or
a $C_2/C_6$ linear low density polyethylene copolymer with a melt index of 2 dg/mm and a resin density of 0.917 g/cc blended with a low density polyethylene homopolymer with a melt index of 0.2 to 2 dg/ mm at a ratio of 95:5 to 75:25; wherein the C layers have a combined total thickness of 60 to 81% of the total thickness of the stretch wrap film; and layer E comprises:
a $C_2/C_4$ linear low density polyethylene copolymer with a melt index of 2 dg/mm, or
a $C_2/C_6$ linear low density polyethylene copolymer with a melt index of 3 dg/ mm and a resin density of 0.917 g/cc, wherein layer E has a thickness of 5 to 10% of the thickness of the stretch wrap film.

19. The multi-layer, thermoplastic stretch wrap film of claim 1, wherein said seven polymeric layers are represented by the following formula: A/C/B/C/D/C/E, wherein layer A comprises:
a $C_2/C_4/C_6$ very low density polyethylene terpolymer with a melt index of 2.5 dg/min and a resin density of 0.910 g/cc, and layer A is 2% of the total thickness of said stretch wrap film, or
a $C_2/C_6$ linear low density polyethylene copolymer blended with a $C_2/C_3$ copolymer to form a polymer with a melt index of 2.5 dg/ min and a resin density of 0.915, and layer A is 5% of the total thickness of the stretch wrap film;

layers B and D each comprise:
a $C_2/C_6$ metallocene catalyzed copolymer resin with a melt index of 1 dg/mm and a resin density of 0.917 g/cc and a melt flow ratio of 16–20 g/10 min; wherein B and D have a thickness of 7 to 10% of the total thickness of the stretch wrap film;

layers C comprises:
a blend of a $C_2/C_6$ linear low density polyethylene copolymer with a melt index of 1 dg/mm and a low density polyethylene with a melt index of 2 dg/mm in a weight ratio of 95:5 to 75:25; wherein the C layers have a combined total thickness of 60 to 81% of the total thickness of the stretch wrap film; and layer E comprises:
a $C_2/C_4$ linear low density polyethylene copolymer with a melt index of 2 dg/mm, or
a $C_2/C_6$ linear low density polyethylene copolymer with a melt index of 3 dg/mm and a resin density of 0.917 g/cc, wherein layer E has a thickness of 5 to 10% of the thickness of the stretch wrap film.

20. The multi-layer, thermoplastic stretch wrap film of claim 1, wherein said seven polymeric layers are represented by the following formula: A/C/B/C/D/C/E, wherein layers A and E each comprise:
a $C_2/C_4$ linear low density polyethylene copolymer with a melt index of 2 dg/min and a resin density of 0.910 g/cc, and layers A and E each are 5 to 10% of the total thickness of said stretch wrap film, layers B and D each comprise:
a $C_2/C_6$ linear low density polyethylene copolymer resin with a melt index of 2 dg/mm and a resin density of 0.910 g/cc, and layers B and D each are 7 to 10% of the total thickness of the stretch wrap film; and layer C comprises:
a blend of a $C_2/C_4$ linear low density polyethylene copolymer with a melt index of 2 dg/mm and a density of 0.910 g/cc, and the C layers have a combined total thickness of 60 to 81% each of the total thickness.

21. The multi-layer, thermoplastic stretch wrap film of claim 1, wherein at least one of said five inner layers comprise metallocene catalyzed polyethylene with a melt index of 0.5 to 5 dg/min and a melt flow ratio of 30 to 50 g/10 min, wherein said at least one of said five inner layers is 5 to 80 weight percent of the total film.

22. The multi-layer, thermoplastic stretch wrap film of claim 1, wherein the dart impact as measured by the F-50 dart drop test procedure is at least 75 to 200 g/mil.

23. The multi-layer, thermoplastic stretch wrap film of claim 1, wherein the melt flow index is between 0.2 and 10 dg/min.

24. The multi-layer, thermoplastic stretch wrap film of claim 1, wherein at least one layer comprises a blend of at least two of said resins.

25. The multi-layer, thermoplastic stretch wrap film of claim 1, wherein said seven polymeric layers are represented by the following formula: A/C/B/C/D/C/E, wherein the relative thickness of the layers is 7/24/7/24/7/24/7, % thickness, respectively, with layers A and E each comprising a linear low density polyethylene hexene-copolymer, layers B and D each comprising a metallocene catalyzed linear low density polyethylene copolymer, and each layer C comprising a linear low density polyethylene hexene-copolymer.

26. The multi-layer, thermoplastic stretch wrap film of claim 1, wherein the resin density for each layer is about 0.880 to 0930 g/cc.

27. The multi-layer, thermoplastic stretch wrap film of claim 1, wherein the resin density for each layer is about 0.900 to 0.925 g/cc.

28. A multi-layer, thermoplastic stretch wrap film containing seven polymeric layers, comprising:
(a) two outer layers, at least one of which having a cling performance of at least 100 grams/inch, said outer layer being selected from the group consisting of linear low density polyethylene, very low density polyethylene, and ultra low density polyethylene resins, said resins being homopolymers, copolymers, or terpolymers, of ethylene and alpha-olefins; and
(b) five inner layers, with each layer being selected from the group consisting of linear low density polyethylene, very low density polyethylene, ultra low density polyethylene, and metallocene-catalyzed linear low density polyethylene resins; said resins being homopolymers, copolymers, or terpolymers, of ethylene and $C_3$ to $C_{20}$ alpha-olefins,
wherein at least one of said inner layers comprises a metallocene catalyzed linear low density polyethylene resin with a melt index of 0.5 to 3 dg/min and a melt index ratio of 16 to 80.

* * * * *

UNITED STATES PATENT AND TRADEMARK OFFICE
CERTIFICATE OF CORRECTION

| | | |
|---|---|---|
| PATENT NO. | : 6,265,055 B1 | Page 1 of 1 |
| APPLICATION NO. | : 09/419009 | |
| DATED | : July 24, 2001 | |
| INVENTOR(S) | : Simpson et al. | |

It is certified that error appears in the above-identified patent and that said Letters Patent is hereby corrected as shown below:

In claim 2, at column 9, line 58, "arc propylene" should be --are propylene--

Signed and Sealed this

Second Day of June, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,265,055 C2 | Page 1 of 2 |
| APPLICATION NO. | : 90/008347 | |
| DATED | : April 7, 2009 | |
| INVENTOR(S) | : Simpson et al. | |

It is certified that error appears in the above-identified patent and that said Letters Patent is hereby corrected as shown below:

On the Title page of *ex parte* reexamination certificate 6761, the "Reexamination Certificate for:" information should read as follows:

Reexamination Certificate for:
    Patent No.: 6,265,055
    Issued: Jul. 24, 2001
    Appl. No.: 09/419,009
    Filed: Oct. 13, 1999

Claim 1, bridging columns 1 and 2, should read as follows:

1. A multi-layer, thermoplastic stretch wrap film containing seven separately identifiable polymeric layers, comprising:

(a) two identifiable outer layers, at least one of which having a cling performance of at least 100 grams/inch, said outer layer being selected from the group consisting of linear low density polyethylene, very low density polyethylene, and ultra low density polyethylene resins, said resins being homopolymers, copolymers, or terpolymers, of ethylene and alpha-olefins; and (b) five identifiable inner layers, with each layer being selected from the group consisting of linear low density polyethylene, very low density polyethylene, ultra low density polyethylene, and metallocene-catalyzed linear low density polyethylene resins; said resins are homopolymers,

UNITED STATES PATENT AND TRADEMARK OFFICE
CERTIFICATE OF CORRECTION

PATENT NO. : 6,265,055 C2
APPLICATION NO. : 90/008347
DATED : April 7, 2009
INVENTOR(S) : Simpson et al.

It is certified that error appears in the above-identified patent and that said Letters Patent is hereby corrected as shown below:

copolymers, or terpolymers, of ethylene and $C_3$ to $C_{20}$ alpha-olefins; *wherein each of said two outer layers and each of said five inner layers have different compositional properties when compared to a neighboring layer.*

Signed and Sealed this

Fourteenth Day of July, 2009

JOHN DOLL
*Acting Director of the United States Patent and Trademark Office*

(12) EX PARTE REEXAMINATION CERTIFICATE (5645th)
United States Patent
Simpson et al.

(10) Number: US 6,265,055 C1
(45) Certificate Issued: Jan. 2, 2007

(54) MULTILAYER STRETCH CLING FILM

(76) Inventors: David Simpson, 1719 Joben Dr., Murfreesboro, TN (US) 37128; Terry Jones, 439 Royal Glen Blvd., Murfreesboro, TN (US) 37128

Reexamination Request:
No. 90/006,336, Jul. 26, 2002

Reexamination Certificate for:
Patent No.: 6,265,055
Issued: Jul. 24, 2001
Appl. No.: 09/419,009
Filed: Oct. 13, 1999

(51) Int. Cl.
*B32B 27/32* (2006.01)

(52) U.S. Cl. ............ 428/213; 428/215; 428/354; 428/516

(58) Field of Classification Search ............ 428/213, 428/215, 354, 516
See application file for complete search history.

(56) References Cited

U.S. PATENT DOCUMENTS 5,273,809 A    12/1993  Simmons ............ 428/212
5,756,219 A    5/1998   Miro et al. ............ 428/516
5,814,399 A    9/1998   Eichbauer ............ 428/220
6,093,480 A    7/2000   Eichbauer ............ 428/213

OTHER PUBLICATIONS

ExxonMobil Chemical News Release, "Recent Polyethylene Expansion Extends Exxon Chemical's Exceed Polyethylene Options", Oct. 1998.
Esposito, "Quintec Looking to Fill Stretch Film Niche," *Plastic News*, May 18, 1998.

*Primary Examiner*—D. S. Nakarani

(57) ABSTRACT

A novel multi-layer stretch film comprising at least 7 layers and having excellent mechanical properties and stretch film performance, comprising two outer, or skin layers that have moderate to high controlled cling and low blocking characteristics, and at least five internal layers to assist in producing mechanical strength and stretchability. The resins used in the film composition include polypropylene (PP), ethylene propylene copolymers, low density polyethylene (LDPE), linear low density polyethylene (LLDPE), medium density polyethylene (MDPE), high density polyethylene (HDPE), metallocene-catalyzed polyethylene (mPE), very low density polyethylene (VLDPE), and/or ultralow density polyethylene (ULDPE). The resins also may be blended to achieve a desired range of physical or mechanical properties of the final film product.

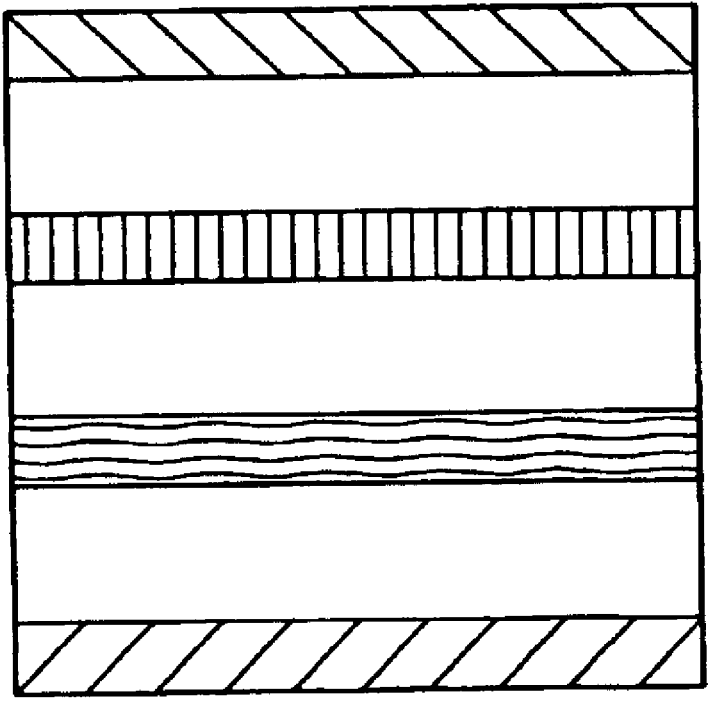

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 28 is confirmed.

Claims 1, 18, 19 and 20 are determined to be patentable as amended.

Claims 2–17 and 21–27, dependent on an amended claim, are determined to be patentable.

1. A multi-layer, thermoplastic stretch wrap film containing seven *separately identifiable* polymeric layers, comprising:
   (a) two *identifiable* outer layers, at least one of which having a cling performance of at least 100 grams/inch, said outer layer being selected from the group consisting of linear low density polyethylene, very low density polyethylene, and ultra low density polyethylene resins, said resins being homopolymers, copolymers, or terpolymers, of ethylene and alpha-olefins; and
   (b) five *identifiable* inner layers, with each layer being selected from the group consisting of linear low density polyethylene, very low density polyethylene, ultra low density polyethylene, and metallocene-catalyzed linear low density polyethylene resins; said resins are homopolymers, copolymers, or terpolymers, of ethylene and $C_3$ to $C_{20}$ alpha-olefins.

18. The multi-layer, thermoplastic stretch wrap film of claim 1, wherein said seven polymeric layers are represented by the following formula: A/C/B/C/D/C/E, wherein
    layer A comprises:
      a $C_2/C_4/C_6$ very low density polyethylene terpolymer with a melt index of 2.5 dg/min and a resin density of 0.910 g/cc, and layer A is 2% of the total thickness of said stretch wrap film, or
      a $C_2/C_6$ linear low density polyethylene copolymer blended with a $C_2/C_3$ copolymer to form a polymer with a melt index of 2.5 dg/min and a resin density of 0.915, and layer A is 5% of the total thickness of the stretch wrap film;
    layer B and D each comprise:
      a $C_2/C_6$ metallocene catalyzed copolymer resin with a melt index of 1 or 2.5 [dg/mm] *dg/min* and a resin density of 0.910 g/cc and a melt flow ratio of 16–20 g/10 min; wherein B and D have a thickness of 7 to 10% of the total thickness of the stretch wrap film;
    layers C comprise:
      a $C_2/C_6$ linear low density polyethylene copolymer with a melt index of 2 [dg/mm] *dg/min* and a resin density of 0.917 g/cc, or
      a $C_2/C_6$ linear low density polyethylene copolymer with a melt index of 2 [dg/mm] *dg/min* and a resin density of 0.917 g/cc blended with a low density polyethylene homopolymer with a melt index of 0.2 to 2 [dg/mm] *dg/min* at a ratio of 95:5 to 75:25; wherein the C layers have a combined total thickness of 60 to 81% of the total thickness of the stretch wrap film; and
    layer E comprises:
      a $C_2/C_4$ linear low density polyethylene copolymer with a melt index of 2 [dg/mm] *dg/min*, or
      a $C_2/C_6$ linear low density polyethylene copolymer with a melt index of [dg/mm] *dg/min* and a resin density of 0.917 g/cc, wherein layer E has a thickness of 5 to 10% of the thickness of the stretch wrap film.

19. The multi-layer, thermoplastic stretch wrap film of claim 1, wherein said seven polymeric layers are represented by the following formula: A/C/B/C/D/C/E, wherein
    layer A comprises:
      a $C_2/C_4/C_6$ very low density polyethylene terpolymer with a melt index of 2.5 dg/min and a resin density of 0.910 g/cc, and layer A is 2% of the total thickness of said stretch wrap film, or
      a $C_2/C_6$ linear low density polyethylene copolymer blended with a $C_2/C_3$ copolymer to form a polymer with a melt index of 2.5 dg/min and a resin density of 0.915, and layer A is 5% of the total thickness of the stretch wrap film;
    layers B and D each comprise:
      a $C_2/C_6$ metallocene catalyzed copolymer resin with a melt index of 1 [dg/mm] *dg/min* and a resin density of 0.917 g/cc and a melt flow ratio of 16–20 g/10 min; wherein B and D have a thickness of 7 to 10% of the total thickness of the stretch wrap film;
    layers C comprises:
      a blend of $C_2/C_6$ linear low density polyethylene copolymer with a melt index of 1 [dg/mm] *dg/min* and a low density polyethylene with a melt index of 2 [dg/mm] *dg/min* in a weight ratio of 95:5 to 75:25; wherein the C layers have a combined total thickness of 60 to 81% of the total thickness of the stretch wrap film; and
    layer E comprises:
      a $C_2/C_4$ linear low density polyethylene copolymer with a melt index of 2 [dg/mm] *dg/min*, or
      a $C_2/C_6$ linear low density polyethylene copolymer with a melt index of 3 [dg/mm] *dg/min* and a resin density of 0.917 g/cc, wherein layer E has a thickness of 5 to 10% of the thickness of the stretch wrap film.

20. The multi-layer, thermoplastic stretch wrap film of claim 1, wherein said seven polymeric layers represented by the following formula: A/C/B/C/D/C/E, wherein
    layers A and E each comprise:
    a $C_2/C_4$ linear low density polyethylene copolymer with a melt index of 2 dg/min and a resin density of 0.910 g/cc, and layers A and E each are 5 to 10% of the total thickness of said stretch wrap film,
    layers B and D each comprise:
    a $C_2/C_6$ linear low density polyethylene copolymer with a melt index of 2 [dg/mm] *dg/min* and a resin density of 0.910 g/cc, and layers B and D each are 7 to 10% of the total thickness of the stretch wrap film; and
    layers C comprises:
    a blend of $C_2/C_4$ linear low density polyethylene copolymer with a melt index of 2 [dg/mm] *dg/min* and a density of 0.910 g/cc, and the C layers have a combined thickness of 60 to 81% each of the total thickness.

* * * * *

(12) EX PARTE REEXAMINATION CERTIFICATE (6761st)
United States Patent
Simpson et al.

(10) Number: US 6,265,055 C2
(45) Certificate Issued: Apr. 7, 2009

(54) MULTILAYER STRETCH CLING FILM

(75) Inventors: David Simpson, Murfreesboro, TN (US); Terry Jones, Murfreesboro, TN (US)

(73) Assignee: Quintec Films Corporation, Shelbyville, TN (US)

Reexamination Request:
No. 90/008,347, Nov. 28, 2006

Reexamination Certificate for:
Patent No.: 6,265,055
Issued: Jan. 13, 1999
Appl. No.: 09/419,009
Filed: Oct. 13, 1999

Reexamination Certificate C1 6,265,055 issued Jul. 24, 2001

(51) Int. Cl.
*B32B 27/32* (2006.01)

(52) U.S. Cl. .................. 428/213; 428/215; 428/354; 428/516

(58) Field of Classification Search .................. None
See application file for complete search history.

(56) References Cited
U.S. PATENT DOCUMENTS 5,273,809 A 12/1993 Simmons
5,387,501 A 2/1995 Yajima et al.
5,749,202 A 5/1998 Eichbauer
5,756,219 A 5/1998 Miro et al.

OTHER PUBLICATIONS

Research Disclosure 37632, "Advantages of Metallocene Ethylene Polymer Resins in Blown and Cast Stretch Films", pp. 1–5 (1995).
ExxonMobil Chemical News Release (Oct. 20, 1998).

*Primary Examiner*—Jerry D. Johnson

(57) ABSTRACT

A novel multi-layer stretch film comprising at least 7 layers and having excellent mechanical properties and stretch film performance, comprising two outer, or skin layers that have moderate to high controlled cling and low blocking characteristics, and at least five internal layers to assist in producing mechanical strength and stretchability. The resins used in the film composition include polypropylene (PP), ethylene propylene copolymers, low density polyethylene (LDPE), linear low density polyethylene (LLDPE), medium density polyethylene (MDPE), high density polyethylene (HDPE), metallocene-catalyzed polyethylene (mPE), very low density polyethylene (VLDPE), and/or ultralow density polyethylene (ULDPE). The resins also may be blended to achieve a desired range of physical or mechanical properties of the final film product.

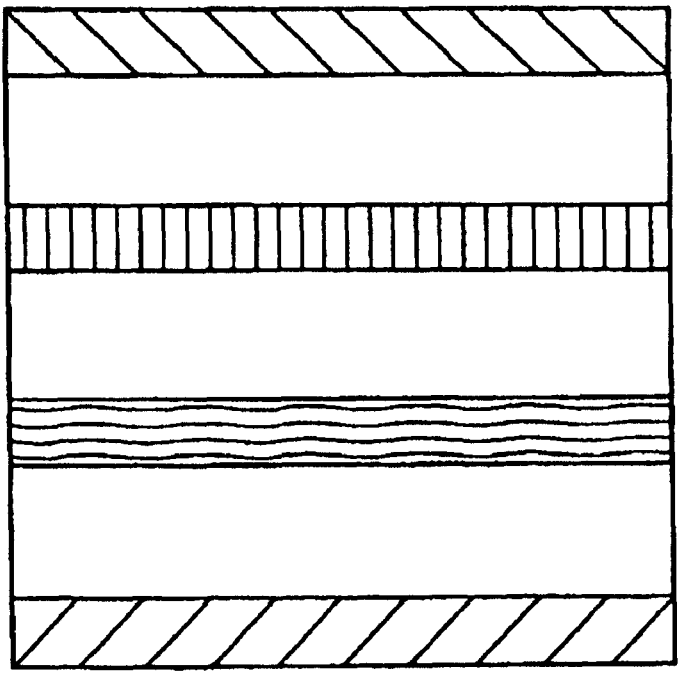

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 26 is cancelled.

Claims 1 and 28 are determined to be patentable as amended.

Claims 2–15, 17, 21–25 and 27, dependent on an amended claim, are determined to be patentable.

New claims 29–35 are added and determined to be patentable.

Claims 16 and 18–20 were not reexamined.

1. A multi-layer, thermoplastic stretch wrap film containing seven polymeric layers, comprising:
   (a) two outer layers, at least one of which having a cling performance of at least 100 grams/inch, said outer layer being selected from the group consisting of linear low density polyethylene, very low density polyethylene, and ultra low density polyethylene resins, said resins being homopolymers, copolymers, or terpolymers, of ethylene and alpha-olefins; and
   (b) five inner layers, with each layer being selected from the group consisting of linear low density polyethylene, very low density polyethylene, ultra low density polyethylene, and metallocene-catalyzed linear low density polyethylene resins; said resins are homopolymers, copolymers, or terpolymers, of ethylene and $C_3$ to $C_{20}$ alpha-olefins;

*wherein each of said two outer layers and each of said five inner layers have different compositional properties when compared to a neighboring layer.*

28. A multi-layer, thermoplastic stretch wrap film containing seven polymeric layers, comprising:
   (a) two outer layers, at least one of which having a cling performance of at least 100 grams/inch, said outer layer being selected from the group consisting of linear low density polyethylene, very low density polyethylene, and ultra low density polyethylene resins, said resins being homopolymers, copolymers, or terpolymers, of ethylene and alpha-olefins; and
   (b) five inner layers, with each layer being selected from the group consisting of linear low density polyethylene, very low density polyethylene, ultra low density polyethylene, and metallocene-catalyzed linear low density polyethylene resins; said resins being homopolymers, copolymers, or terpolymers, of ethylene and $C_3$ to $C_{20}$ alpha-olefins, wherein at least one of said inner layers comprises a metallocene catalyzed linear low density polyethylene resin with a melt index of 0.5 to 3 dg/min and a melt index ratio of 16 to 80; *and wherein each of said two outer layers and each of said five inner layers have different compositional properties when compared to a neighboring layer.*

*29. The film of claim 1, wherein the compositional property is tensile strength.*

*30. The film of claim 1, wherein the compositional property is melt index.*

*31. The film of claim 1, wherein the compositional property is density.*

*32. The film of claim 1, wherein the compositional property is the presence of a resin additive.*

*33. The film of claim 28, wherein the compositional property is tensile strength.*

*34. The film of claim 28, wherein the compositional property is melt index.*

*35. The film of claim 28, wherein the compositional property is density.*

\* \* \* \* \*

(12) EX PARTE REEXAMINATION CERTIFICATE (8451st)
United States Patent
Simpson et al.

(10) Number: US 6,265,055 C3
(45) Certificate Issued: Aug. 2, 2011

(54) MULTILAYER STRETCH CLING FILM

(75) Inventors: David Simpson, Murfreesboro, TN (US); Terry Jones, Murfreesboro, TN (US)

(73) Assignees: Terry F. Jones, Christiana, TN (US); Charles M. Leonard, Murfreesboro, TN (US)

Reexamination Request:
No. 90/009,644, Jan. 21, 2010

Reexamination Certificate for:
Patent No.: 6,265,055
Issued: Jul. 24, 2001
Appl. No.: 09/419,009
Filed: Oct. 13, 1999

Reexamination Certificate C1 6,265,055 issued Jan. 2, 2007

Reexamination Certificate C2 6,265,055 issued Apr. 7, 2009

Certificate of Correction issued Jun. 2, 2009.

Certificate of Correction issued Jul. 14, 2009.

(51) Int. Cl.
*B32B 27/32* (2006.01)

(52) U.S. Cl. .................. 428/213; 428/215; 428/354; 428/516

(58) Field of Classification Search .................. 428/213
See application file for complete search history.

(56) References Cited

U.S. PATENT DOCUMENTS

| 5,273,809 A | 12/1993 | Simmons |
| 5,749,202 A | 5/1998 | Eichbauer |
| 5,756,219 A | 5/1998 | Miro et al. |

OTHER PUBLICATIONS

"Advantages of Metallocene Ethylene Polymer Resins in Multilayer Stretch Films", Research Disclosure 41926, pp. 1–22, published in Mar. 1999, published in U.S.A.

*Primary Examiner* — Jerry D. Johnson

(57) ABSTRACT

A novel multi-layer stretch film comprising at least 7 layers and having excellent mechanical properties and stretch film performance, comprising two outer, or skin layers that have moderate to high controlled cling and low blocking characteristics, and at least five internal layers to assist in producing mechanical strength and stretchability. The resins used in the film composition include polypropylene (PP), ethylene propylene copolymers, low density polyethylene (LDPE), linear low density polyethylene (LLDPE), medium density polyethylene (MDPE), high density polyethylene (HDPE), metallocene-catalyzed polyethylene (mPE), very low density polyethylene (VLDPE), and/or ultralow density polyethylene (ULDPE). The resins also may be blended to achieve a desired range of physical or mechanical properties of the final film product.

LAYER A 10% 

LAYER $C_1$ 20% 

LAYER B 10% 

LAYER $C_2$ 20% 

LAYER D 10% 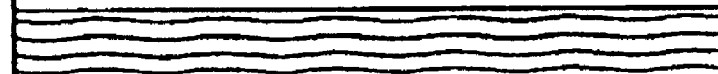

LAYER $C_3$ 20% 

LAYER E - 10% 

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-17, 21-25 and 27-35 is confirmed.

Claim 26 was previously cancelled.

Claims 18-20 were not reexamined.

* * * * *